Figure 1:
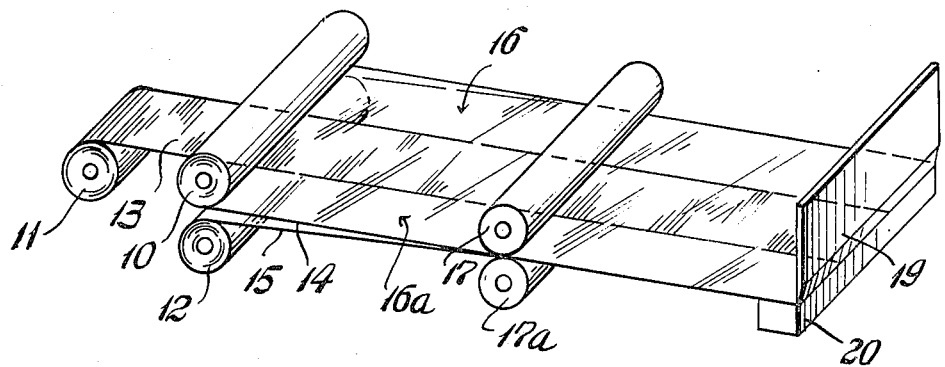

United States Patent [19]
Kozlowski et al.

[11] 3,896,991
[45] July 29, 1975

[54] COMPOSITE FLEXIBLE, SEMI-RIGID MATERIALS AND PROCESS FOR MAKING SAME

[76] Inventors: Edward C. Kozlowski, 74 Columbine Dr., Trumbull, Conn. 06611; Matthew D. Chamlin, 322-A Hailman St., Pittsburgh, Pa. 15206

[22] Filed: Feb. 28, 1973

[21] Appl. No.: 336,722

[52] U.S. Cl............. 229/55; 229/14 BL; 229/3.5 R; 161/145; 161/250
[51] Int. Cl............................................ B65d 33/02
[58] Field of Search.......... 229/55, 14 BL, 14 B, 53, 229/3.5 R; 161/145, 250

[56] References Cited
UNITED STATES PATENTS
2,148,454  2/1939  Gerard............................. 229/3.5 R
2,370,680  3/1945  Moore............................... 229/3.5 R

*Primary Examiner*—William I. Price
*Assistant Examiner*—Douglas B. Farrow
*Attorney, Agent, or Firm*—Arthur A. Johnson; Thomas L. Tully

[57] ABSTRACT

Novel flexible, semi-rigid fabricating material comprising a laminate of top and bottom layers of relatively thin synthetic plastic film and a middle layer of semi-rigid sheet material, said top and bottom layers being substantially wider than said middle layer to provide marginal film-to-film areas of sufficient dimensions to form end closures when said laminate is formed into a dimensional container having sides corresponding to the width of said semi-rigid middle layer.

7 Claims, 7 Drawing Figures

PATENTED JUL29 1975

3,896,991

SHEET 1

PATENTED JUL 29 1975 3,896,991

SHEET 2

COMPOSITE FLEXIBLE, SEMI-RIGID MATERIALS AND PROCESS FOR MAKING SAME

The present invention is concerned with providing an inexpensive, attractive plastic fabricating material which is light in weight and which is suitable for a variety of uses and is particularly useful for the production of form-retaining structures such as disposable wastebaskets and barrels, product containers, bags, and the like.

It is known to produce bags from limp plastic films such as thin polyethylene, polyvinylidene chloride, and the like, for use as trash can liners, leaf-collecting bags, garbage bags, and the like. However such films and containers are not form-retaining or self-supporting and must be given container form by means of a rigid supporting container such as a wastebasket or barrel. It is also known to produce collapsible containers such as bags from semi-rigid materials such as paper, paperboard, or the like. However the semi-rigidity of such materials makes it difficult to form the end closures of the container, i.e. the sealed bottom and the open top which must be closed by folding the semi-rigid material together. Such semi-rigid containers are not watertight or water-resistant unless specialty paper or paperboard is used. Also, while information and/or designs can be printed more easily on paper than on plastic film, such printing is susceptible to obliteration because of the tendency of paper to become soiled and/or wet.

It is the principal object of the present invention to provide a novel flexible, semi-rigid fabricating material which is inexpensive, attractive and convenient to use.

It is another object of this invention to provide inexpensive, attractive, flexible, plastic-composite containers which are self-supporting when opened to a dimensioned shape.

It is yet another object of this invention to provide a fabricating laminate of flexible, relatively thin plastic films having sandwiched therebetween a semi-rigid sheet material, each surface of which is completely bonded to a plastic film and at least one surface of which carries indicia which is protected against exposure to moisture, water, soiling and attrition by means of the plastic film laminated thereto.

Figure 2:
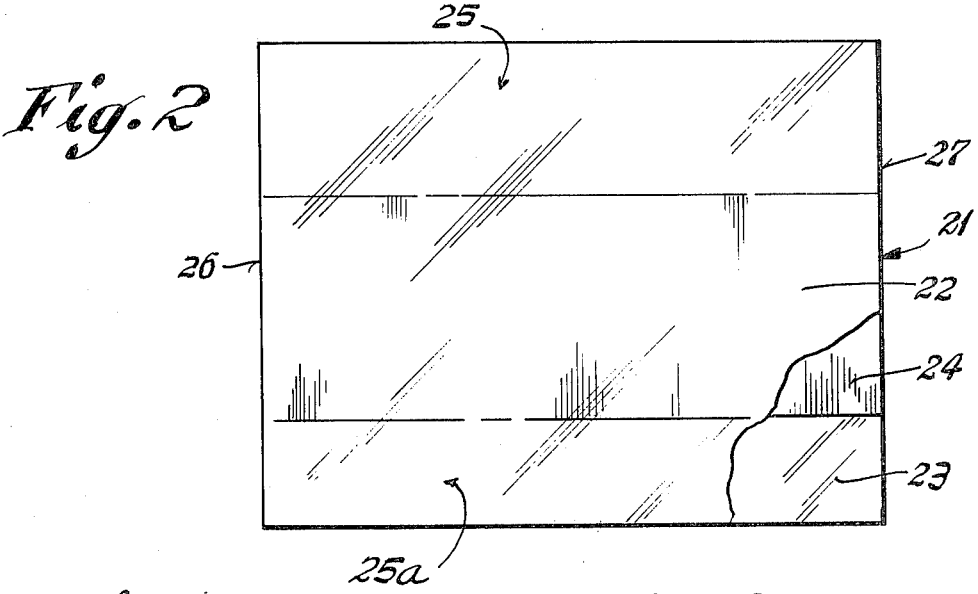
Figure 3:
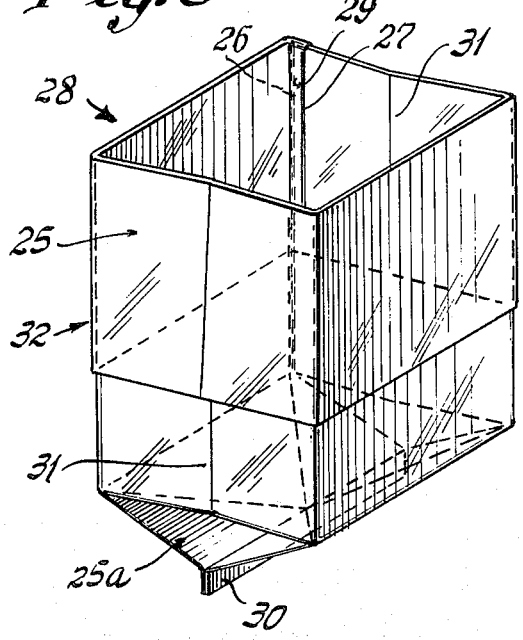
Figure 4:
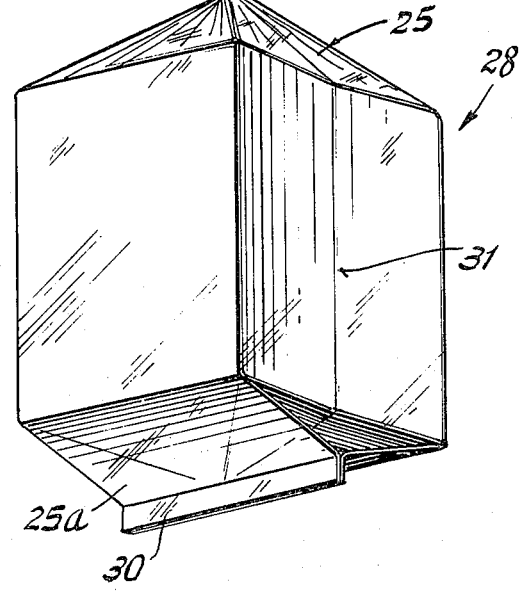
Figure 5:
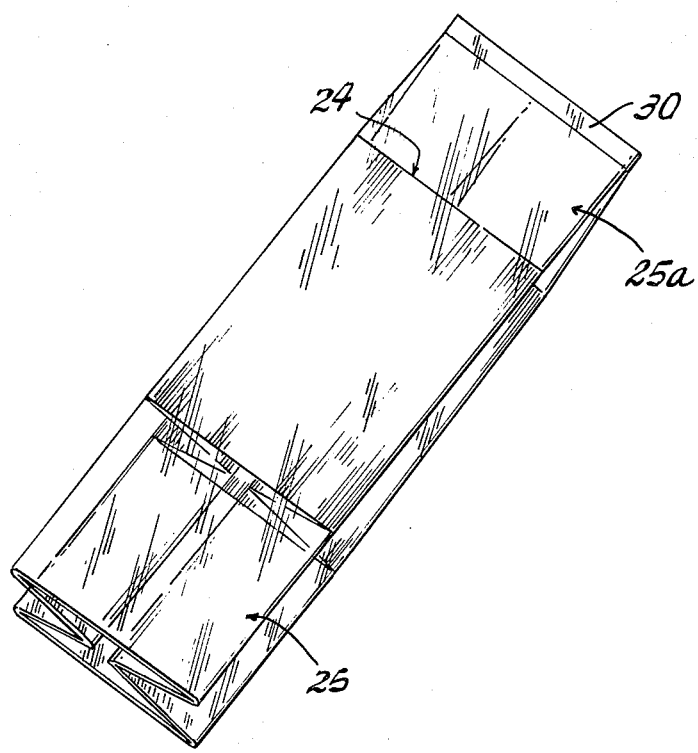
Figure 6:
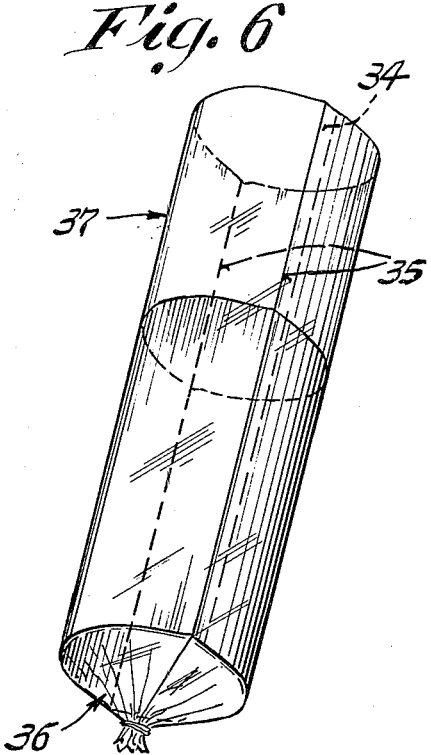
Figure 7:
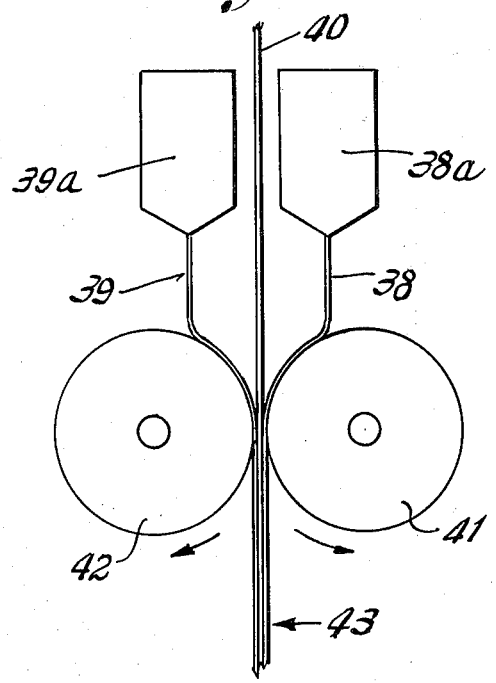

These and other objects and advantages of the present invention will be apparent to those skilled in the art in the light of the present disclosure including the drawings, in which:

FIG. 1 is a perspective diagrammatic view of an apparatus suitable for positioning, laminating and cutting the novel fabricating material of the present invention, FIG. 2 is a plan view of a length of fabricating material as produced by the apparatus of FIG. 1 and suitable for a variety of uses, FIG. 3 is a perspective top view of a form-retaining, self-supporting container produced from the length of material shown in FIG. 2, FIG. 4 is a perspective bottom view of the container of FIG. 3, illustrating the upper margin of film gathered and bound to seal the container, FIG. 5 is a perspective bottom view illustrating the container of FIG. 4 prior to use, empty and flattened for shipping or storage, FIG. 6 is a perspective bottom view of a cylindrical container according to the invention, and FIG. 7 is a perspective diagrammatic view of a coextrusion apparatus for producing laminates according to another embodiment of the present invention.

The novel film laminates of the present invention can be produced by a number of different methods, as will be discussed hereinafter, but the apparatus of FIG. 1 represents one suitable means for producing the desired results. According to FIG. 1, rolls, 10, 11 and 12 are positioned so that the continuous length of semi-rigid sheet material 13 on roll 11 is expended between and substantially centered between the continuous lengths of synthetic plastic film 14 and 15 expended from rolls 10 and 12 respectively. The widths of films 14 and 15 are substantially the same, while the width of semi-rigid sheet material 13, such as paper, is substantially more narrow so as to provide film-to-film marginal areas 16 and 16a.

The superposed sheets are then bonded together across their entire surface areas to the exclusion of any trapped air such as by pressing the sheets together between heated rollers 17 and 17a to form the web laminate which is subsequently cut into sheet lengths such as by means of a blade 19 against a cutting block 20.

The cut sheet lengths 21, as shown by FIG. 2, comprise top film 22, bottom film 23 and middle sheet 24 of semi-rigid material, the films 22 and 23 being bonded together at marginal areas 25 and 25a and each also being bonded to the respective sides of sheet 24 in the central areas where they contact sheet 24. The width of marginal areas 25 and 25a is sufficient that when the ends 26 and 27 of the laminate 21 are united to form a cylinder, which is subsequently folded into a quadrohedral shape having a rectangular opening, the marginal areas 25 and 25a of laminated film can be brought together to seal the top and bottom of the rectangle. Thus the width of the marginal areas must be greater than one-half the length of the narrow sides of the rectangle. In the case of a cylindrical container, the width of the marginal areas would be greater than about one-half the diameter of the cylinder. The width of the marginal areas need not be identical and in fact it is preferred for most uses that the width of the marginal area forming the opening of the container be greater than the width of the marginal area forming the base, as shown by areas 25 and 25a in FIGS. 2 to 5. This is so because the base is generally permanently presealed by machine and excess film is undesirable at the base, whereas excess film is desirable at the opening in order to facilitate the manual closing of the container and the application of a sealing means such as a string, twist-tie, or the like.

FIG. 3 illustrates a square container 28 formed from the sheet 21 of FIG. 2 by uniting the cut ends 26 and 27, as shown by heat-weld 29, and by uniting the extremities of marginal area 25a of the film, as shown by heat-weld 30, to seal the bottom of the container. As illustrated, the square container is produced by bonding the ends 26 and 27 of the sheet to form a cylindrical tube, folding the tube in conventional manner to form a flat tube having two opposite walls or panels connected by creased panels having intermediate bellows folds 31, and then heat-sealing the extremities of the marginal areas 25a while the folded tube is flat, as illustrated by FIG. 5 of the drawings.

When the square container is opened, as illustrated by FIGS. 3 and 4, the sealed bottom takes on a square configuration which accommodates the square shape of the container, and the upper marginal area 25 of film can be inverted over the outside of the container, if desired, as shown at 32, so as to leave the opening unrestricted for use as a receptacle.

The container can be sealed, when desired, by gathering the marginal area 25 of limp film and applying a permanent or temporary fastener such as tape, string, heat-seal, rib-slot, or other means including the twist-tie illustrated at 33 of FIG. 4.

As illustrated by FIGS. 2 and 3, the present containers are form-retaining and self-supporting due to the presence of the semi-rigid sheet material 24 confined between the plastic films 22 and 23. The films increase the rigidity of material 24 since they are bonded thereto, so that even relatively lightweight paper stock such as ordinary 5 pound Kraft paper is sufficient to provide the desired rigidity for certain uses. However the relative rigidity of the central sheet material 24 does not interfere with the limpness of the plastic film in the marginal areas 25 and 25a, whereby the sealed bottom of the container is limp and relaxed and does not distort the shape of the container and the limp marginal area 25 at the top of the container inverts easily to place it out of the way during use of the open container and can be permanently or temporarily sealed as discussed supra to seal the container after use without placing any stress upon the sides of the container.

FIG. 6 illustrates a cylindrical container produced from the sheet laminate of FIG. 2 by uniting the cut ends 26 and 27 of the sheet of FIG. 2, as shown by heat-weld 34 adjacent one of two opposed creases 35 adapted to permit the container to lie flat. The bottom marginal area 25a of the sheet of FIG. 2 is gathered together and heat-sealed or bonded to form a bottom closure 36 and the top marginal area 37 can be gathered and permanently or temporarily sealed when the container has been filled. Obviously the width of the marginal film areas must exceed the radius of the cylindrical container in order for the top and bottom closures to be formed.

It will be evident to those skilled in the art of fabricating packages, wrappers, containers and other items from paper, paperboard, fabric, plastic film, metal foil, and the like, that the present sheet materials as illustrated by FIG. 2 of the drawings are useful for a variety of applications in which their properties of central rigidity and marginal limpness, low cost, moisture- and water-resistance and ability to be folded flat represent a substantial improvement of prior known materials, combination of materials, containers and packages.

A variety of different materials and combinations of different materials are suitable for the fabrication of the present sheet materials. Preferred materials for use as the exposed synthetic plastic films 14 and 15 are the thin thermoplastic films conventionally used in heat-seal packaging. Such films include but are not limited to polyethylene, polypropylene, polystyrene, nylon, polyvinylidene chloride (saran), chlorinated rubber (Pliofilm), and the like. Such films and/or combinations thereof can be adhered to each other and to the central support sheet 13 by applying sufficient heat to render the films tacky. The use of an adhesive bonding layer is optional. Other films are also suitable but may require the presence of an adhesive layer to cause them to bond to each other and to the central support sheet. Included are films such as polyethylene terephthalate (Mylar), cellulose acetate, polyvinyl chloride, and the like. The preferred adhesive coatings are those based upon thermoplastic resins whereby the coating is non-tacky at room temperature but becomes tacky and adhesive when heated, such as a coating of polyethylene resin or acrylic resin and such adhesive coatings may be applied to the film or to the central sheet or both.

The most preferred films for most uses are those which are limp, such as saran, polyethylene and polypropylene, since such films can be gathered readily to form the end closures of the present containers and offer the least resistance to the opening of the containers from flat condition to a dimensioned shape. However other relatively thin flexible films have this same ability, to a lesser extent, provided that they are used in combination with central support sheets which are relatively rigid as discussed below.

The preferred material for the flexible, semi-rigid central support sheet 13 is self-supporting paper, i.e., paper sufficiently strong to stand by itself when folded or rolled into a single sheet cylinder. Heavier papers and rigid paperboard stock are also suitable, as are semi-rigid or rigid non-paper materials such as plastic films having a thickness greater than about 5 mils, metallic foil such as aluminum foil, stiffened fabrics such as crinoline, thin wood ply, thin leather sheeting, and the like. The phrase "relatively rigid" is used herein and in the claims to include rigid and semi-rigid materials having a rigidity or stiffness substantially greater than the outer films.

The plastic films 14 and 15 can be different materials or combinations of different materials having different properties such as water-vapor transmission, gas permeability absorbency, light fastness, or the like, as may be required by the particular application and that films which are oriented for strength and/or for heat-shrinkability are particularly useful. Such films can be directionally oriented with respect to one another to provide various desirable properties such as strength and tear-resistance. Heat-shrink films adhered to the central support appear to impart greater rigidity thereto as a result of shrinkage.

The central support sheet can be printed, embossed, cut-out, or otherwise pretreated in order to provide decorative or functional indicia on the central support sheet, which indicia will be visible through the outer transparent or translucent plastic film and will be protected against obliteration by said film. If desired, the inner film, such as 15, can be tinted or pigmented so as to have a color or opacity contrasting with the color or lack of color of the outer film 14 and/or of the support sheet 13. Color tints may be provided by the adhesive coatings, if present.

It should be understood that the various elements which make up the present laminates and items fabricated therefrom may themselves consist of combinations of similar materials having slightly different properties. For example, plastic film 14 may consist of a laminate of two or more films so as to have exposed surfaces having different properties. The surface exposed to and laminated to the support sheet can consist of a film having good bonding properties for the support sheet 13 while the outer surface can consist of a different film having good printability, scuff-resistance, lack of toxicity, etc. The same is true for film 15. Likewise the support sheet 13 can be a laminate of relatively rigid materials such as paper, metal foil and/or other materials, to provide decorative and/or functional results.

According to another embodiment of the present invention, as illustrated by FIG. 7 of the drawings, the present fabricating materials may be produced directly in association with conventional film extrusion machines whereby films 38 and 39 are coextruded directly from the slot-shaped dies 38a and 39a of conventional extrusion machines and laminated together with the support sheet 40 therebetween, or whereby one film is preformed, contacted with and/or adhered to the central support sheet and then extrusion-coated, over the surface carrying the central support sheet, with the second film.

As shown by FIG. 7, support sheet 40 is fed, appropriately centered, in the nip of films 38 and 39 between pressure rollers 41 and 42 to produce a continuous laminate 43 capable of being severed into sheet lengths of the appearance illustrated by FIG. 2 of the drawings.

Thus the term "laminate" is used herein and in the claims to encompass combinations of bonded films and support sheets regardless of whether one or more of such films and sheets are preformed or simultaneously formed.

The fabricating material may be creased if it is to be formed into an angular structure such as a box. This may be done either immediately after the laminate is formed or at some subsequent stage during the actual formation of the final structure. The creasing is imparted in a direction transverse to the web, i.e., across the width of the support material and film, and may be accomplished by conventional heat-embossing or impact systems. It should be understoood that the tubular containers of the present invention may be cylindrical or polyhedral in structure and that the creases therein need not be straight but can be of any desired curve as may imparted by a curve-shaped creasing rule or by dies.

If desired, the final polyhedral or cylindrical structure may be produced immediately after the laminate is formed and cut into sheet lengths because it is an important advantage of such structures that they can be folded flat for convenience in packaging and shipping. This is accomplished by any of the methods known in the art of forming plastic bags, whereby the laminate sheets are creased to impart the desired folding characteristics, the leading edge 27 and the trailing edge 26 are bonded together to form a tubular laminate and the extremities of the bottom marginal area 25a are bonded together in precreased, folded condition to form the sealed bottom of the structure. Generally the step of bonding the edges 26 and 27 and the extremities of film margin 25a is accomplished by means of heat and pressure such as by means of heated pressure bars or plates or by ultrasonic welding means. The folded structure is flat and light in weight for storage or shipment, and can be unfolded or opened easily to provide a container or receptacle which is self-supporting and form-retaining because of the presence and location of the central support material.

As a result of the plastic-to-plastic seal provided by the present laminate fabricating materials, such materials are exceptionally useful for purposes which require air-, vapor-, odor- and/or water-tightness, such as meat wrappers, liquid containers, freezer containers, and the like, the central support material being insulated from the contents and from the atmosphere and bring printed or otherwise marked with an identification of the contents. Also such structure, combined with plastic films having the necessary heat-resistance, inertness, and other properties, provides containers capable of being sterilized in conventional manner for use as food containers for liquids and solids, such containers being permanently sealed at both ends after the filling operation in order to guarantee freshness of the contents prior to use. The use of heat-shrink plastic films provides particularly effective, attractive and functional results in connection with the packaging of meats and other foods since the package can be heat-shrunk after it is filled and this causes the marginal film areas 25 and 25a to shrink into conformity with the dimensions of the contents while the shrinkage of the film in the central areas is restricted because of its lamination to the non-shrinkable support sheet 24. Thus the appearance of the film in the central area, including any information or ornamentation printed thereon, is not distorted.

Variations and modifications may be made within the scope of the claims and portions of the improvements may be used without others.

We claim:

1. A container formed from a laminate comprising a self-supporting strip of determinate length and width, a first relatively thin, flexible, inner plastic strip adhered to the inner surface of said support strip and a second thin, flexible, outer plastic strip adhered to the outer surface of said support strip, said first and second plastic strips being of the same length as the support strip at the opposed edges of the laminate but being substantially wider than said support strip and having continuous projecting marginal portions extending substantially beyond each surface of the support strip and being completely adhered together in face-to-face relation at the ends of the laminate, the opposed edges of the laminate being secured together by means of a unitary plastic-to-plastic seal to form a tubular container in which the rigid support sheet is completely enveloped and sealed between the inner and outer plastic strips, the projecting marginal portions of the plastic strips of the tubular container being continuous and sufficiently wide to be folded inwardly along the edges of the support strip at the ends of the laminate to form end closures for the container whereby the encased rigid support strip constitutes the support of the container.

2. A container according to claim 1 in which the tubular container is cylindrical.

3. A container as defined in claim 1 in which at least one of said marginal portions of said superposed plastic strips is heat-sealed to itself to form an end closure on at least one end of the container.

4. A container as defined in claim 1 in which said first and second plastic strips comprise heat-sealable synthetic thermoplastic materials.

5. A container according to claim 1 in which the tubular laminate is provided with transverse creases to provide a rectangular tubular structure capable of being folded flat.

6. A container according to claim 1 in which said support sheet is selected from the group consisting of paper, metal foil, textile fabric, wood, leather and rigid plastic film.

7. A container according to claim 1 in which the outer surface of said support sheet is provided with indicia which is visible through the outermost plastic film.

* * * * *